C. H. FELTEN.
AUTOMOBILE SIGNAL.
APPLICATION FILED MAY 6, 1918.
1,352,946.
Patented Sept. 14, 1920.
2 SHEETS—SHEET 1.
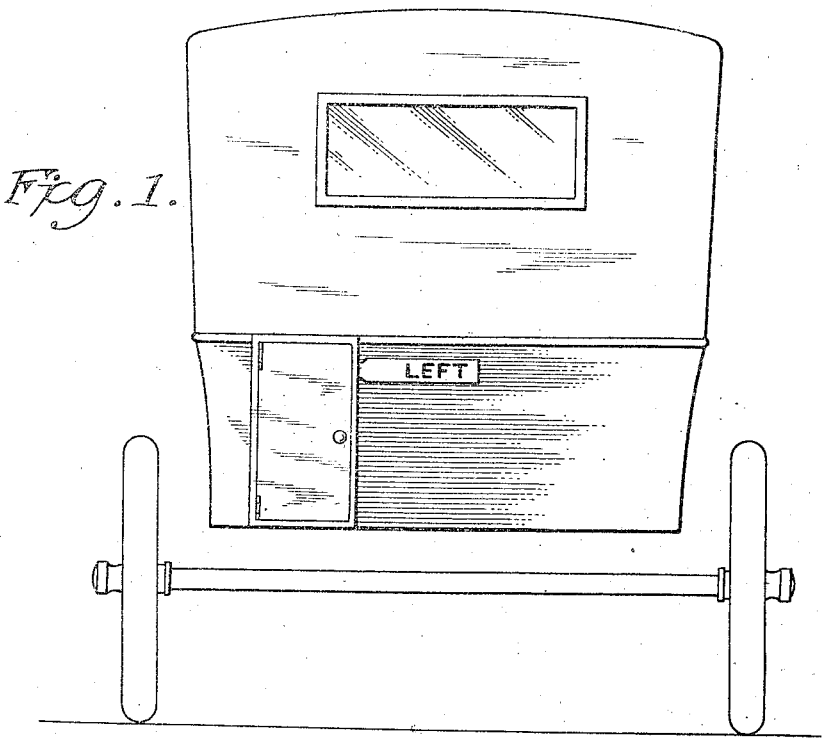
Fig. 1.
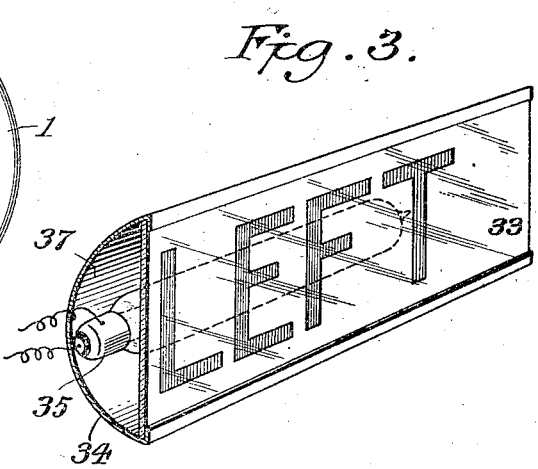
Fig. 3.
Fig. 2.
Inventor
Charles H. Felten
By his Attorney
James H. Carlow

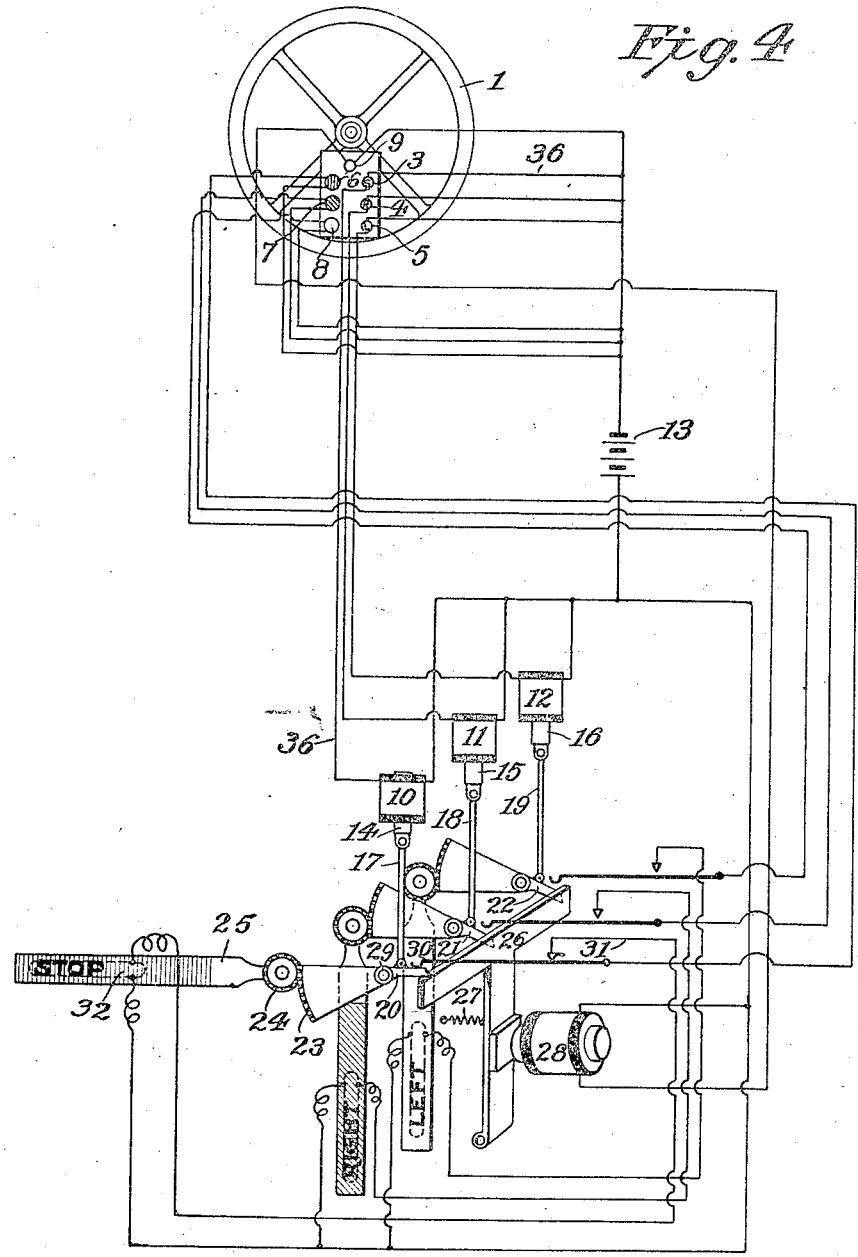

UNITED STATES PATENT OFFICE.

CHARLES H. FELTEN, OF WEST HOBOKEN, NEW JERSEY.

AUTOMOBILE-SIGNAL.

1,352,946.  Specification of Letters Patent.  Patented Sept. 14, 1920.

Application filed May 6, 1918. Serial No. 232,777.

*To all whom it may concern:*

Be it known that I, CHARLES H. FELTEN, a citizen of the United States, and a resident of the town of West Hoboken, in the county of Hudson and State of New Jersey, have invented a certain new and useful Improvement in Automobile-Signals, of which the following is a specification, reference being had to the accompanying drawings.

An object of my invention is to provide a signaling device adapted to be mounted onto an automobile, which device is provided with a plurality of signal arms, which are normally hidden from view, and which are adapted to be selectively projected so as to give notice to an approaching vehicle.

Another object of my invention is to provide means for holding said signal arms in displayed condition until released by the act of the driver or other person controlling the operation of the same.

Another object of my invention is to control the said signal arms from any convenient point in the automobile as for instance the steering wheel, and to provide indicator means to apprise the operator of the positions of the signals.

In the drawings,

Figure 1 is an end view of an automobile equipped with my signaling device;

Fig. 2 is a plan view of the steering wheel with the signaling control switch attached thereto;

Fig. 3 is a perspective view of one of the signal arms; and

Fig. 4 is the diagrammatic view of my device showing the electrical control means thereof.

Referring now in detail to the drawings, 1 represents the steering wheel of an automobile and 2 the switch plate of my signaling device. Through this switch plate project push buttons 3, 4 and 5, and the release push button 9. I have also provided in the switch plate openings for the lamps, 6, 7 and 8.

In circuit with the push buttons 3, 4 and 5 are the solenoids 10, 11 and 12 respectively, said circuits including the source of power or battery 13. These solenoids are provided with the usual plungers 14, 15 and 16 respectively, which are hingedly connected with the respective links 17, 18 and 19 at one end, and at the other end with the respective rocking levers 20, 21 and 22. These levers are normally in the position shown by levers 21 and 22. When the signal arm is in displayed position the lever is in the position shown by lever 20. These levers are preferably fan-shaped at one end where I have provided a gear segment 23 in mesh with the pinion 24 secured to the hinged end of the signal arm 25.

I have provided a signal-arm holder 26 which is adapted to hold signal-arms in displayed position. This signal holder is preferably hinged at one end as shown and held in normal position by the spring 27, out of contact with the magnet 28. This magnet is controlled by the release button 9 which when depressed throws it into circuit with the battery 13 and energizes the same whereupon it draws the holder 26 to itself clearing any of the levers 20, 21 or 22 which may be, at the time, supported by said holder.

In the drawings, I have shown a signaling system embodying the control of three signal-arms, "right," "left" and "stop." As the mechanism and method of operating each of these signal-arms is similar, I will describe the mechanism and method of operating only one signal-arm, namely the "stop" from which description the mechanism and method of operating the other signal-arms will be readily understood. Upon pressing the button operating the signal-arm 3, the solenoid 10 is energized drawing in the sliding core 14, and with it, the hinged link 17 and the lever 20 which is hinged at 29. This operation engages the gear segment at the fan-shaped end of the said lever with the pinion 24 and raises the signal-arm "stop." The narrow end of the lever 20 in its upward movement presses away the holder 26 until it clears the same when the said holder is spring-drawn back into normal position and the lever 20 is supported in position thereon, thus holding the signal-arm "stop" in displayed position after the circuit, completed by the pressure of the button 3, has been broken.

Upon the raising of the narrow end of the lever 20 the same raises the switch 30 closing the circuit 31 causing the illumination of the lamps 32 and 6 which are wired in series in said circuit, the lamp 32 illuminating the sign on the signal-arm and the lamp 6 indicating that the signal-arm is extended and the signal lamp illuminated.

In Fig. 3 I have shown a detail of one of the signal-arms in which 33 is a transparent plate having the proper inscription thereon, which is mounted in and forms one side of a housing 34 in which a lamp 35 is disposed. This housing is provided with a light reflector 37.

The operation of my device is as follows: If it is desired to notify the operator of an approaching vehicle that the operator of the vehicle equipped with this signaling device is about to stop, he will press the button numbered 3 on which is the initial "S" standing for "Stop." This action will energize the solenoid 10 through the circuit 36 and will draw the sliding plunger 14 into the solenoid and with it will draw upward the connected link 17 and the rocking lever 20. As the rocking lever moves upward at its narrow end, the fan-shaped end which is provided with a gear segment moves downward, the gear segment engaging with the pinion 24 on the signal-arm and moves the signal-arm upward. As the narrow end of the lever 20 is raised it presses outward the spring-drawn holder 26 until it clears the same when the said holder assumes its normal position and supports the narrow end of the lever 20, thus mechanically holding the displayed signal-arm in position without electrical influence. In its movement upward the narrow end of the lever 20 raises the switch 30 in series and thus illuminates said lamps. When it is desired to drop the signal-arm to its normal position the release button 9 is depressed and thereby the magnet 28 in circuit with said release button 9 is energized and draws the holder 26 to itself and away from the narrow end of the lever 20, whereby the support of the displayed signal-arm being taken away, the same drops by gravity into normal position.

I have attempted in the foregoing description and accompanying drawings to show what I believe to be the best embodiment of my invention. It is understood, however, that departures may be made from the embodiment shown, without departure from the spirit of my invention, and I therefore do not wish to be restricted to the embodiment which I have illustrated and described, but what I wish to cover by Letters Patent is set forth in the accompanying claim.

Claim:

In an automobile signaling device, a swinging signal-arm, means adapted to swing said signal-arm to display position comprising a lever and a solenoid operating said lever, an electric circuit embodying said solenoid, said circuit being adapted to be opened and closed, and when closed, to energize said solenoid, a second electric circuit, adapted to be opened, and means for closing said second circuit by the operation of the aforesaid lever, a signal-arm lamp and an indicator lamp in series in said second circuit, a signal-arm holder adapted to support one end of said lever and through it said signal-arm when in display position, a third electric circuit, a magnet in said circuit, said circuit being adapted to be opened and closed, and when closed, to energize said magnet and withdraw said signal-arm holder away from said lever permitting the signal-arm to drop into normal position.

CHARLES H. FELTEN.

Witnesses:
 JAMES N. CATLOW,
 SADIE WEISS.